United States Patent
Stephens, Jr.

(10) Patent No.: US 11,014,670 B2
(45) Date of Patent: May 25, 2021

(54) RECONNAISSANCE AND PAYLOAD DEPLOYMENT METHODS FOR ROBOTIC SPACE EXPLORATION

(71) Applicant: Kenneth Dean Stephens, Jr., Saint George, UT (US)

(72) Inventor: Kenneth Dean Stephens, Jr., Saint George, UT (US)

( * ) Notice: Subject to any disclaimer, the term of this patent is extended or adjusted under 35 U.S.C. 154(b) by 359 days.

(21) Appl. No.: 16/136,249

(22) Filed: Sep. 20, 2018

(65) Prior Publication Data

US 2019/0135438 A1 May 9, 2019

Related U.S. Application Data

(60) Provisional application No. 62/581,599, filed on Nov. 3, 2017.

(51) Int. Cl.
| | |
|---|---|
| *B64D 1/12* | (2006.01) |
| *B64G 1/62* | (2006.01) |
| *B64B 1/58* | (2006.01) |
| *B64G 4/00* | (2006.01) |
| *H04N 5/232* | (2006.01) |
| *B64B 1/40* | (2006.01) |

(Continued)

(52) U.S. Cl.
CPC .............. *B64D 1/12* (2013.01); *B64B 1/40* (2013.01); *B64B 1/58* (2013.01); *B64G 1/105* (2013.01); *B64G 1/62* (2013.01); *B64G 4/00* (2013.01); *H04N 5/23206* (2013.01); *B64G 2001/1064* (2013.01); *B64G 2001/1071* (2013.01); *B64G 2004/005* (2013.01); *H04W 84/18* (2013.01)

(58) Field of Classification Search
CPC .................. B64G 1/62; B64G 2001/1071
See application file for complete search history.

(56) References Cited

U.S. PATENT DOCUMENTS

| | | | | | |
|---|---|---|---|---|---|
| 3,589,644 | A | * | 6/1971 | Salkeld | ..................... F41G 7/34 244/164 |
| 4,240,601 | A | * | 12/1980 | Reed | ..................... B64C 39/024 244/158.9 |

(Continued)

*Primary Examiner* — Joseph W Sanderson

(57) ABSTRACT

A method for the deployment of reconnaissance devices including buoy cameras and robotic devices in a target mission area of a remote location in space utilizing a maneuverable descent de-booster capsule and a buoyant vessel for the deployment is disclosed, including identifying the target area from an orbiting spacecraft; deploying the de-booster into orbit over the target area; initiating gradual descent of the de-booster in the atmosphere of the remote location in space; ejecting the buoyant vessel and its payload from the de-booster; filling the buoyant portion of the buoyant vessel with a lifting gas to cause the buoyant portion to become a large balloon; activating reconnaissance devices on the bay portion of the buoyant vessel, including video and other devices for monitoring and surveiling the target mission area; maneuvering the buoyant vessel to refine mission site selection; opening cargo bay doors at a predetermined altitude to deliver payloads including buoy cameras to the target mission area; causing the at least one buoyant vessel to rise in the atmosphere over the target mission area after payload delivery; and activating communication relay functions in the buoyant vessel while maintaining ongoing reconnaissance activities.

14 Claims, 8 Drawing Sheets

(51) Int. Cl.
*B64G 1/10* (2006.01)
*H04W 84/18* (2009.01)

(56) References Cited

U.S. PATENT DOCUMENTS

| | | | | |
|---|---|---|---|---|
| 5,056,740 | A * | 10/1991 | Roth | B64G 1/62 |
| | | | | 244/158.4 |
| 5,566,909 | A * | 10/1996 | Lapins | B64G 1/105 |
| | | | | 244/173.3 |
| 8,186,625 | B2 * | 5/2012 | De Jong | B64G 1/222 |
| | | | | 244/158.3 |
| 8,690,104 | B2 * | 4/2014 | Hudson | B64G 1/62 |
| | | | | 244/140 |
| 9,073,647 | B2 * | 7/2015 | Helou, Jr. | B64G 1/14 |
| 9,302,788 | B2 * | 4/2016 | Wan | B64B 1/00 |
| 9,884,693 | B2 * | 2/2018 | Nock | B64G 1/58 |
| 10,479,533 | B2 * | 11/2019 | Albright | B64G 1/62 |
| 2002/0066825 | A1 * | 6/2002 | Miralles | B64C 39/024 |
| | | | | 244/49 |
| 2003/0089821 | A1 * | 5/2003 | Miralles | B64C 3/56 |
| | | | | 244/49 |
| 2008/0023587 | A1 * | 1/2008 | Head | B64G 1/62 |
| | | | | 244/158.4 |
| 2008/0078883 | A1 * | 4/2008 | de Jong | B64G 1/222 |
| | | | | 244/158.3 |
| 2012/0175465 | A1 * | 7/2012 | Hudson | B64G 1/12 |
| | | | | 244/140 |
| 2014/0151509 | A1 * | 6/2014 | Zelon | B64G 1/62 |
| | | | | 244/158.9 |
| 2014/0319281 | A1 * | 10/2014 | Helou, Jr. | B64G 1/14 |
| | | | | 244/158.9 |
| 2015/0336685 | A1 * | 11/2015 | Wan | B64B 1/005 |
| | | | | 244/2 |
| 2016/0137320 | A1 * | 5/2016 | Nock | B64G 1/58 |
| | | | | 244/159.2 |
| 2016/0280399 | A1 * | 9/2016 | Tkach | B64G 1/62 |
| 2016/0280400 | A1 * | 9/2016 | Albright | B64G 1/62 |
| 2017/0036782 | A1 * | 2/2017 | Dula | B64G 1/002 |

* cited by examiner

Deployment Sequence for Delivery of Reconnaissance and Robotic Payloads Including Buoyant Vessel

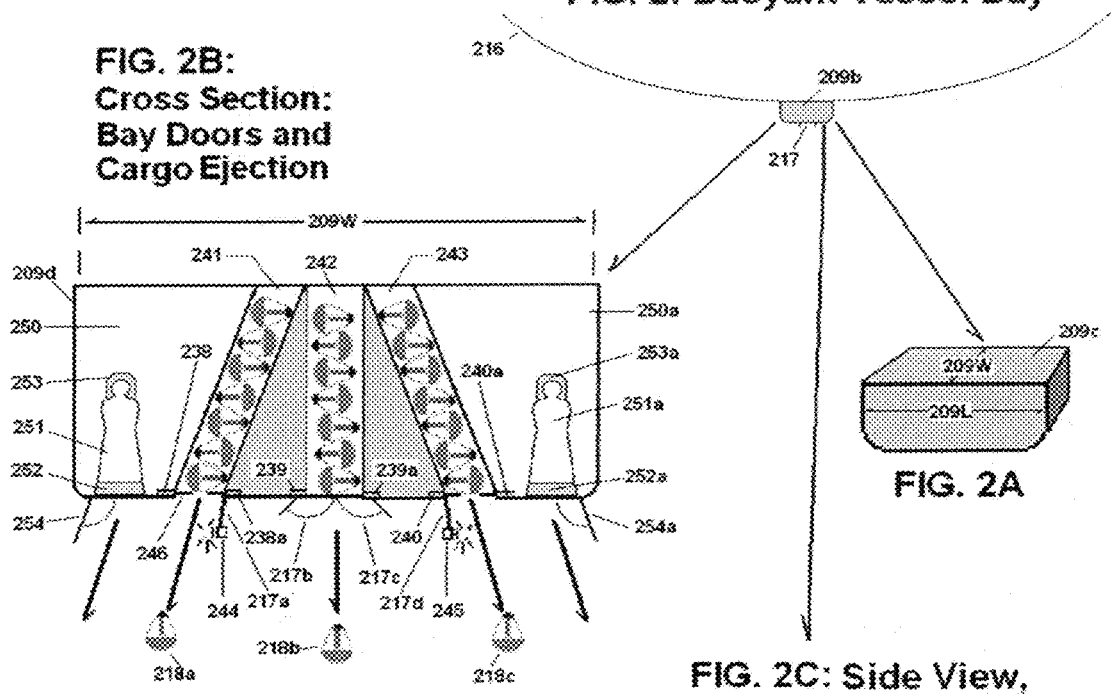
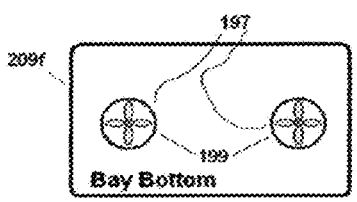
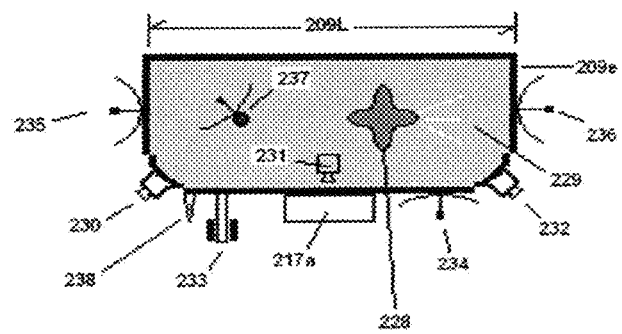

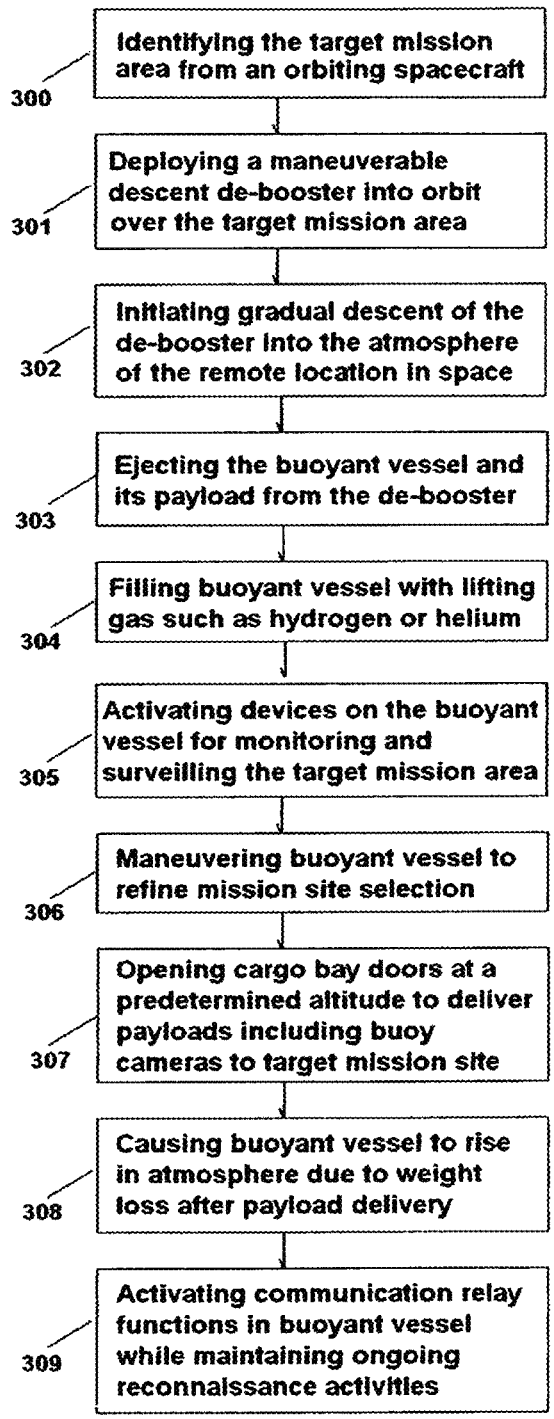

Deployment Sequence for Direct Delivery of Reconnaissance and Robotic Payloads

Flow Diagram of Deployment Sequence for Direct Delivery of Buoy Cameras, Proxy Robotics and Other Mission Components via Descent Capsule to a Target Mission Area in a Remote Location in Space

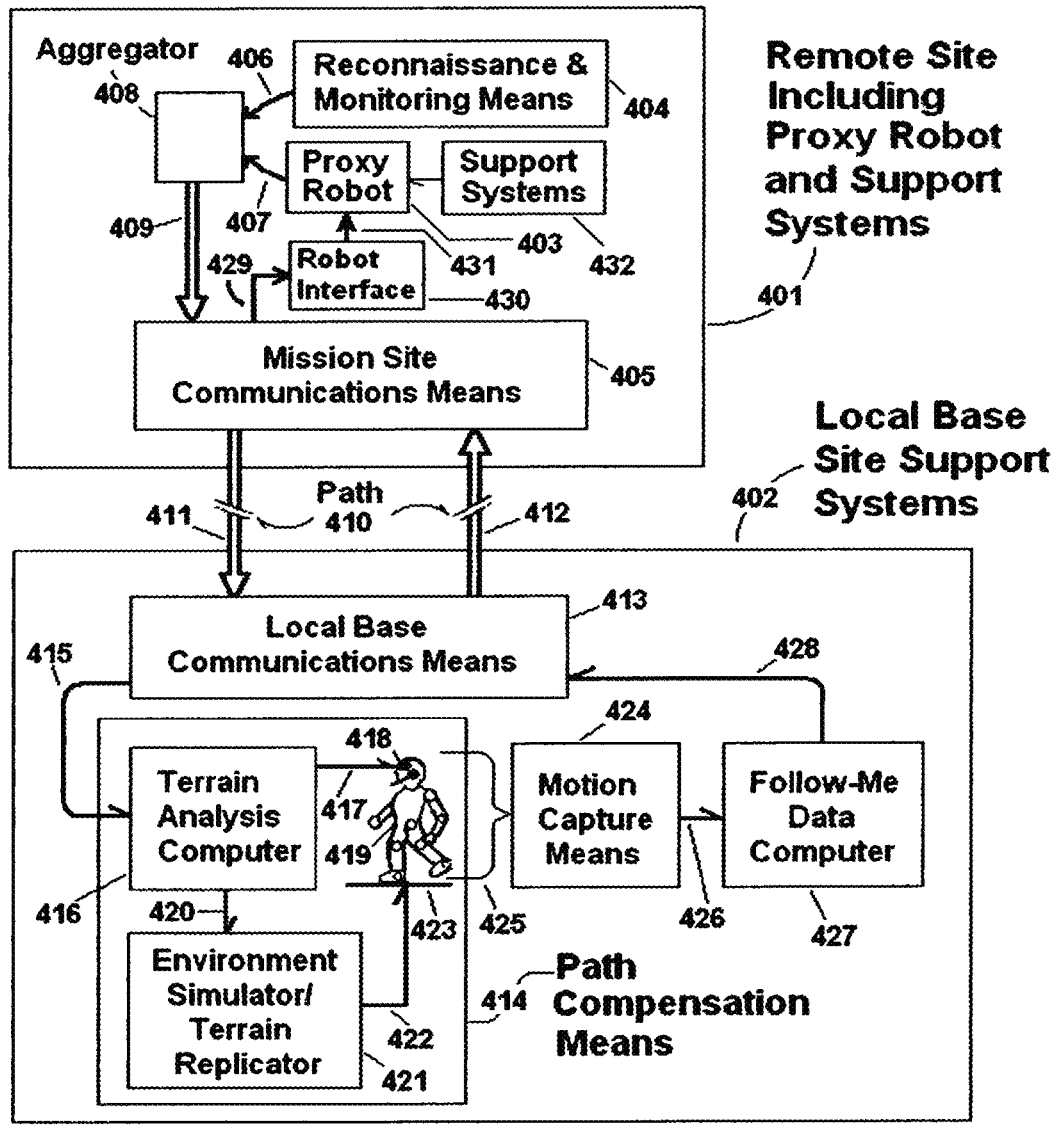
Fig. 6: Diagram of Proxy Robotics Elements

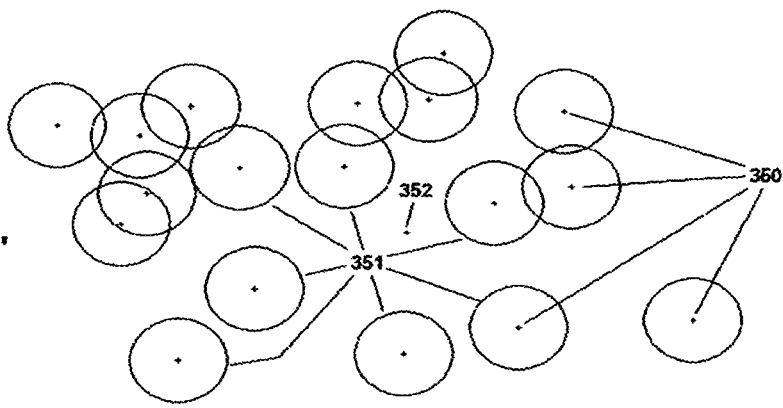
FIG. 7A: Typical "Cluster Bomb" Pattern
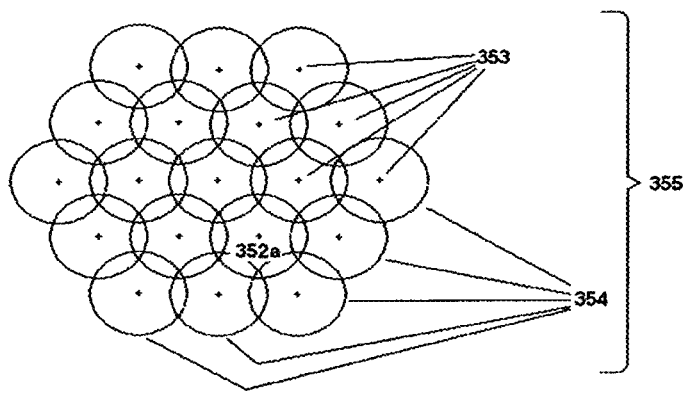
FIG. 7B: Pattern After Proxy Robotic "Cleanup"
FIG. 7C: Exemplary Sequence for Initial Proxy Robotic Layout of Buoy Cameras
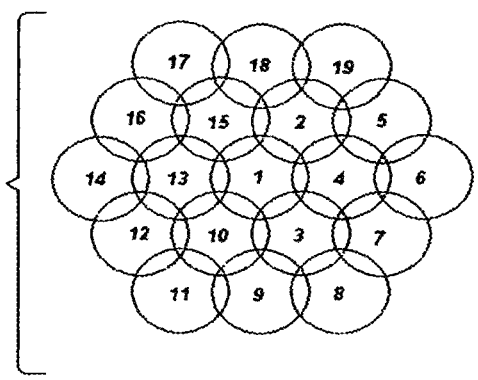
FIG. 7D: Explore Terrain as Buoy Cameras are Distributed
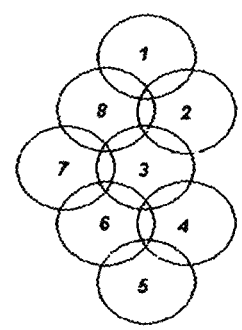

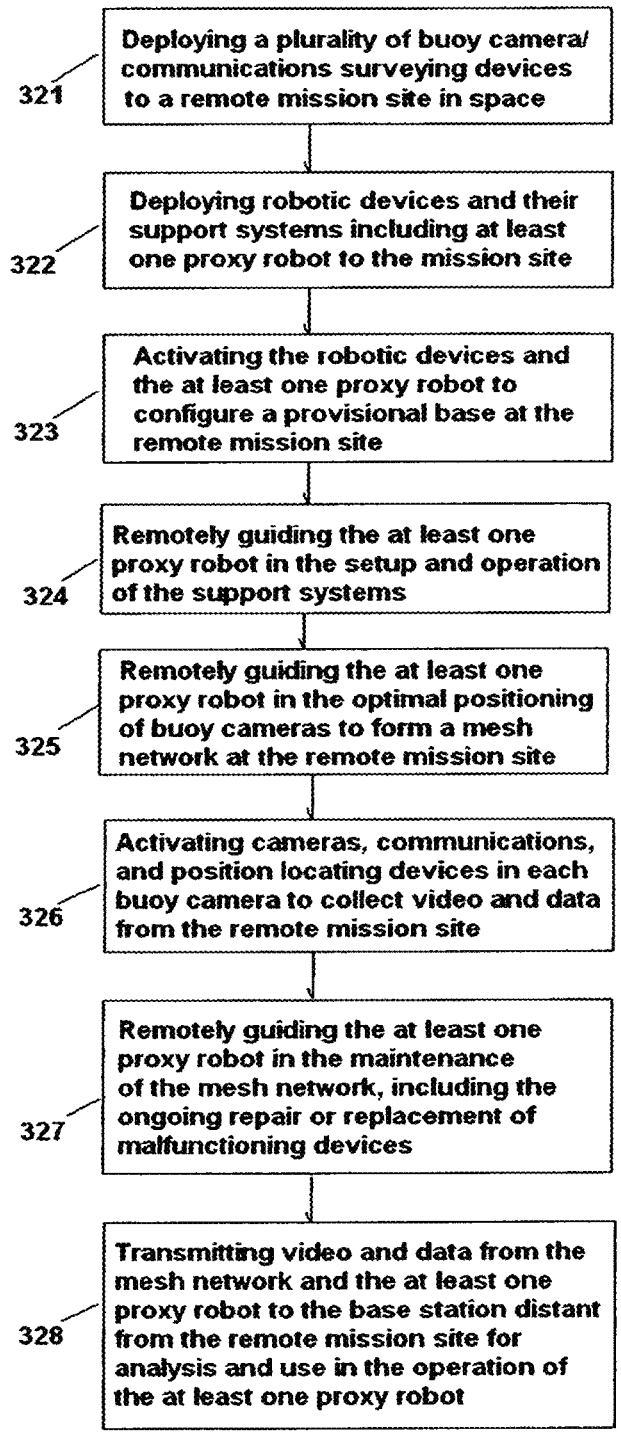
FIG. 8: Flow Diagram for Establishing an Optimal Mesh Network of Buoy Cameras at a Remote Mission Site in Space Utilizing Remotely Controlled Robotic Devices

RECONNAISSANCE AND PAYLOAD DEPLOYMENT METHODS FOR ROBOTIC SPACE EXPLORATION

The present application claims priority to Provisional Application No. 62/581,599 of the above name, filed on Nov. 3, 2017. The application also references inventor's U.S. Pat. No. 9,823,070 "Remote Reconnaissance for Space Exploration", issued Nov. 21, 2017, and U.S. Pat. No. 9,975,248 "Replicating the Remote Environment of a Proxy Robot, issued May 22, 2018.

FIELD OF THE INVENTION

The present claimed invention relates to the establishment of reconnaissance frameworks and the deployment of payloads to a target mission area such as a selected area of a planet. More specifically, payloads including communications, position locating means and proxy robotic devices and their support systems are discussed.

BACKGROUND OF THE INVENTION

The utilization of proxy robots and robotic vehicles in distant space requires an accurate knowledge of the target mission area as well as complete and reliable communications means between the mission site and mission control, typically on earth. Communication and position locating means must also be established on and around the mission site. The current patent discloses such reconnaissance and the deployment of communications and position locating means for proxy robotic devices and their support systems.

OBJECTS OF THE INVENTION

Accordingly, one object of this invention is to disclose methods for the deployment of remote communication and reconnaissance devices;

A second object of this invention concerns safe and reliable deployment of mission devices and systems from a satellite or orbiting spacecraft;

A third object of this invention is to deploy apparatus and systems appropriate to the optimal functioning of a proxy robotic mission site far removed from Earth, A fourth object of this invention is the provision of a buoyant vessel platform for reconnaissance of a remote mission site and for the deployment of payloads to that site, A fifth object of this invention is the utilization of a buoyant vessel platform in the delivery and deployment of buoy cameras, local communication means, proxy robots, robotic vehicles and robotic support systems to a mission site on Mars or elsewhere in space;

A sixth object of this invention is a method to directly deliver payloads including buoy cameras and proxy robots directly to a mission site in space; and A seventh object of this invention is the utilization of proxy robots in the setup and interconnection of communication systems and other elements at a selected mission site.

BRIEF DESCRIPTION OF THE DRAWINGS

FIG. 2 depicts the bay section of the buoyant vessel in FIG. 1;

FIG. 2A is a magnified view of the bay portion of FIG. 2;

FIG. 2B is a magnified cross section view of a portion of FIG. 2;

FIG. 2C is a magnified side view of the bay portion of FIG. 2;

FIG. 2D is a bottom view of the bay portion of FIG. 2 showing downward thrusting electric motor fans;

FIG. 3 is a flow diagram of de-booster and buoyant vessel use in the deployment of reconnaissance devices including buoy cameras;

FIG. 6 is a diagram of proxy robotics elements.

FIG. 7A shows an exemplary "cluster bomb" pattern;

FIG. 7B depicts the pattern of FIG. 7A after proxy robotic "cleanup;"

FIG. 7C shows an exemplary sequence for initial proxy robotic layout of buoy cameras;

FIG. 7D depicts an alternative method for proxy robotic exploration as buoy cameras are distributed, and FIG. 8 is a flow diagram for establishing an optimal buoy camera mesh network at a mission site. in space utilizing remotely controlled robotic devices.

DETAILED DESCRIPTION OF THE DRAWINGS

Figure 1:
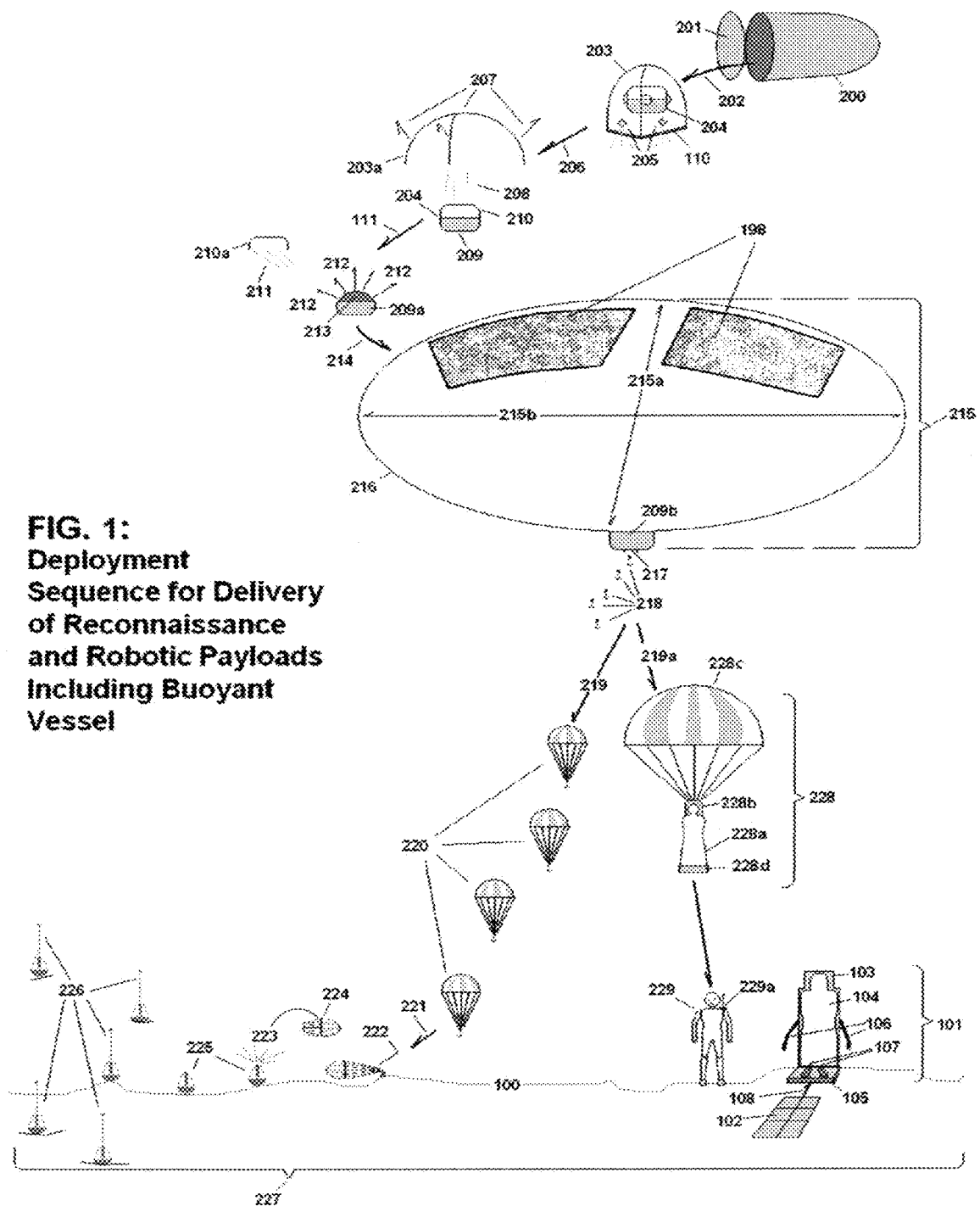
FIG. 1 illustrates an exemplary deployment sequence for buoyant vessel delivery of reconnaissance and robotic payloads at a remote mission site.

FIG. 1 illustrates a sequence for the deployment of reconnaissance, communications and robotic payloads in a remote environment like Mars utilizing a buoyant vessel. First, a space vehicle 200 identifies a target mission area 227 on the surface of the remote environment. Vehicle 200 can represent either a satellite in synchronous orbit around the planet or a spacecraft in an orbit which passes over the general region of a mission. If the remote location is in a polar region of a planet or on a body which has very slow rotation rendering a synchronous orbit impractical, space vehicle 200 can assume non-synchronous orbit or simply pass over the region of the target mission area.

From its location above the target mission area, a cargo door 201 opens on vehicle 200, deploying 202 a maneuverable descent de-booster capsule (de-booster) 203 into synchronous orbit over a rotating body in space such as Mars or a non-synchronous orbit in the cases related above. Inside the de-booster 203 is a compressed buoyant vessel 204 with a deployable payload package, plus fuel sufficient to permit gradual descent to the upper atmosphere of the planet and maneuverability over the identified target mission site with the possible aid of one or more electric fans. 199 (FIG. 2D) powered by electricity from photovoltaic solar panels 198 on the outer skin of the top portion of buoyant vessel balloon section 216

Jets 205 similar to those 228 depicted in FIG. 2C below facing upward, downward and in all horizontal directions permit the de-booster 203 to initiate gradual descent into the upper atmosphere in the case of Mars and maneuver into position over the mission site to refine optimal mission site selection. As de-booster 203 moves through the atmosphere of the planet, a heat shield 110 allows the de-booster to reduce speed while maintaining its integrity and keeping its contents safe.

As braking and descent 206 continue, the de-booster 203 reaches a predetermined altitude over the mission site, at which time the de-booster activates downward-facing jets 205 to brake considerably before opening 207 to eject 208 compressed buoyant vessel 204, the latter consisting of a tightly packed buoyant section 210 and a vessel bay section 209.

As the compressed buoyant vessel 204 continues a gentle descent 111 toward the surface 100 of the planet, it reaches a point where the atmosphere is at some specified pressure. At this time, the top (buoyant section) of vessel 204 fills 212 with helium, hydrogen or a similar lifting gas, causing cap 210a to jettison 211, and the buoyant section 210 to expand 214 into a large balloon shape 216. The size required for balloon portion 216 will vary with each mission, since balloon volume is inversely proportional to the density of the atmosphere above a particular mission site.

When fully expanded, a buoyant vessel 215, made up of buoyant section 216 and connected bay section 209b, activates reconnaissance devices, including photography, video and means to perform position location and other measurements of the mission site, while slowly descending to a predetermined altitude over the mission area 227.

As buoyant vessel 215 gradually descends into the atmosphere above the target mission location, jets 228 secured to its bay (FIG. 2C) enable it to maneuver slowly over the area while continuing reconnaissance of the mission site.

From this slowly moving position, a cargo door 217 opens to "cluster bomb" the target site with a plurality of tightly packed deployable pole camera/communications surveying devices (buoy cameras) 218, with each buoy camera containing at least one video camera, at least one radio beacon, and at least one communication device to connect the buoy camera with space vehicle 200, buoyant vessel 215 and other satellites and surveillance and communication devices including the plurality of buoy cameras deployed at the mission site as well as means to analyze video, positional and other data from the target area (c.f. Stephens U.S. Pat. No. 9,823,070). Each buoy camera 218 contains a weighted portion on the bottom and a pole camera with communication and navigation means on top. Buoy cameras 218 deploy 219 with parachutes, falling over the target mission area 220 until they come to rest 221 on the ground 222 at the mission site 227. Upon impact, each buoy camera 225 jettisons its parachute 224 by means of a small explosive charge 223. After parachute jettison, the pole camera portion telescopes upward 226 as described in the patent above.

Bay section 209b of buoyant vessel 215 will likely contain other payload cargo, particularly including robotic devices such as robotic vehicles (not shown) or proxy robots, represented by proxy robot 229 shown on the surface of the mission site 227. Fully-charged proxy robot 229 is ejected 219a from bay section 209b in a protective enclosure 228a containing the robot 229, packed parachute and mission support supplies 228b such as at least one rolled or folded photovoltaic solar panel 228b and a weighted bottom section 228d which may also contain a charging apparatus for proxy robot 229 and material or devices to absorb the force of ground contact. At a predetermined time in the descent of proxy robot 229, parachute 228c will open, greatly slowing that descent. Some time after reaching the ground 100, proxy robot 229 will be guided to step out of protective enclosure 228a, disconnect parachute 228c, and unpack photovoltaic solar panel(s) 102 for use in charging proxy robots, robotic vehicles and other mission devices.

When proxy robot 229 leaves protective enclosure 228a, it may be guided to position and configure that enclosure as an initial proxy robot charging station 101, complete with rear support element 103, payload packing cutout 104, charging base 105, at least one set of securing straps 106 and indented boot markings 107 for a standing proxy robot. Receiving follow-me commands from its human handler at a base remote from the mission site, proxy robot 229 will position charging station 101 and photovoltaic solar panel 102, then connect 108 the solar panel to the charging station. High density batteries (not shown) internal or external to charging base 105 will transfer the electrical charge received from solar panel 102 to a proxy robot's power supply (not shown) through connections in one or both boot markings 107 or through other connections on the rear plate 103 or elsewhere on the charging station.

FIG. 2 depicts a section of buoyant vessel 216 in FIG. 1 that includes the cargo bay 209b.

FIG. 2A is a magnified view 209c of bay 209b, showing length (direction of travel) line 209L and cross section width line 209W for reference in the figures to follow.

FIG. 2B depicts a cross section view 209d of the cargo portion of bay 209, along width line 209W in FIG. 2A, further enlarged to illustrate how the Buoy Cam cargo can be deployed over a relatively large area of a target mission site. In this example, "cluster bombing" may not strictly apply if the term is in reference to the simultaneous deployment of many buoy cameras, although such a deployment technique remains a viable option if means are employed to push individual buoy cameras apart during the ejection or descent phases of deployment. In FIG. 2B, buoy cameras are stacked in gravity-feed tubes 241, 242 and 243, with each tube holding a total of eight buoy cameras for illustration purposes, including buoy cameras 218a, 218b and 218c which have already been ejected.

In this exemplary illustration, bay doors 217a, 217b-c, and 217d have opened under tubes 241, 242 and 243, respectively, but the buoy cameras in those tubes are restrained from ejecting by detent mechanisms such as solonoids or other electromagnetic means 238, 238a at the exit of tube 241; 239, 239a at the exit of tube 242, and 240, 240a at the exit of tube 243. The body of solonoid 238 is represented by the box on the left, while the moveable piston portion is the black rod 246 immediately to the right of the solonoid body, which blocks the exit of tube 241. A fairly wide and even distribution of buoy cameras at the target mission site can result from the configuration depicted in FIG. 2B, as follows:

First, buoyant vessel 215 slowly moves in a path defined by front-rear line 209L in FIG. 2A. If, for example, vessel 215 moves at a rate of one meter per second and the desired spacing between buoy cameras is 100 meters, a single buoy camera can be released from each of gravity tubes 241-243 by retracting the appropriate electromagnetic detent mechanism 238-240a every 100 seconds for a period sufficient to permit a single buoy camera to deploy from each gravity tube.

Second, horizontal separation can be achieved in small part by the stack angle (and thus the ejection angle) of gravity tubes 241 and 243 in relation to center gravity tube 242, but much greater horizontal separation is possible through the further employment of mechanisms 244 and 245 that give each buoy camera or other ejected cargo extra horizontal thrust as it exits bay 209d. Mechanisms 244 are mounted on bay hatch door 217a, facing outward to bay left in the drawing, while mechanisms 245 are mounted on bay hatch door 217d, facing outward to bay right in FIG. 2B. Mechanisms 244 and 245 are electromagnetic devices similar to solonoids 238, 239 and 240 described above, but while the latter solonoids have long pistons extended in their resting (no current) state, mechanisms 244 and 245 are solonoids that retract in their resting state and protrude very rapidly when current is applied to their coils. The effect of this action is to give each buoy camera or other cargo a hard push to the left or right as it ejects from tube 241 or 243. This sideways thrust is illustrated by the leftward direction of buoy camera 218a and rightward direction of buoy camera 218c, while buoy camera 218b drops straight down from gravity-feed tube 242.

Alternatively, means 244, 245 can employ solonoid-activated "flipper" arms, similar to the flipper mechanisms used on pinball machines, to push buoy cameras or other ejecting cargo to the left or right.

Actual horizontal spacing between the buoy cameras being ejected from each tube vary with the amount of horizontal thrust from means 244 and 245 as well as factors such as the gravity of the mission planet, elevation, and angle of ejection.

In the example of FIG. 2B, only three buoy camera-holding gravity tubes are depicted, but it is to be appreciated that the number can be greater or smaller, and the capacity of each gravity feed tube can likewise be larger or smaller to hold and deploy a greater or lesser number of individual buoy cameras or other camera means, communications means and position-determining means over a target mission area. For example, areas 250 and 250a are depicted, with each holding a proxy robot 251, 251a in a protective enclosure 253, 253a with weighted bottom 252, 252a. In this example, bay doors 254 and 254a open to eject their shrouded proxy robot payloads in the manner described under FIG. 1.

FIG. 2C depicts some of the elements that render bay 209 a reconnaissance and communication relay platform. FIG. 2C is a magnified side view 209e of bay 209b, along length line 209L (FIG. 2A). On each of the four sides 229 of bay 209c, while four-way jet nozzles 228 can move the buoyant vessel 215 up, down, or to the left or right, the downward facing jets are likely to be in the most constant use to prevent overly rapid descent of the buoyant vessel and its payload. This is particularly true on a planet like Mars, with so little atmosphere that even a large buoyant vessel (balloon) cannot maintain significant altitude without help from the thrust of downward facing jets. Video and still cameras 230, 231 and 232 have counterparts on the other side of bay 209c, while box 233 represents radar and other devices for the measurement of parameters like ground and air speed, wind and weather, atmospheric conditions, terrain makeup and surface topography. Antenna 234 is for communication with proxy robots and buoy cameras. Antennas 235, 236 and 237 communicate with orbiting vehicles, distant relay stations and mission control on Earth, while antenna 238 communicates with position beacons and locator transponders at the mission site. Bay door 217a is open in the drawing.

Returning to FIG. 1, when "cluster bombing" of the mission site has been completed, the resulting weight loss will cause buoyant vessel 215 to rise upward in the Martian atmosphere until it reaches equilibrium in its naturally buoyant state without further use of the downward facing jets, although some of the four-way jets 228 will activate from time to time to maintain the buoyant vessel's altitude and position over the mission site. A stable buoyant vessel platform allows a communication relay function to be activated as part of the craft's ongoing reconnaissance duties.

The communication relay function, which can be activated either remotely or automatically when certain conditions are met, includes the relaying of all video and data from the mission site to mission control as well as the follow-me commands from human handlers at mission control that guide proxy robot activities at the mission site. The relay function can also include communication with satellites and spacecraft in the area and relaying a plurality of other signals and data from the mission site to other communications means on Earth, above the mission site, or elsewhere on the planet, moon or other body in space where the mission site is located. On other missions, the actions described in FIGS. 1 and 2 can deliver other payloads to a planet's surface such as mission site construction materials, power sources, vehicles, tools and additional robotic devices, including robotic vehicles, proxy robots and their support systems.

FIG. 2D is a bottom 209f view of the bay portion of FIG. 2 showing downward thrusting electric motor fans 199, mounted offset from the bottom 209f such that air from a planet with atmosphere can enter at fan top and exit under the fans, which may be in a cage. Electric fans 199 may also be mounted on the side panels of bay 209b, for example, alongside other devices depicted in FIG. 2C. Although two electric fans 199 are depicted, a single unit or any greater number can be employed. The relative size of fans 199 is also for illustration only, since some optimal combination of motor torque and fan size would be determined to provide lift and prevent overly rapid descent at each prospective deployment location. Wires 197 bring electrical power from the photovoltaic solar panels 198 on the outer skin of the top portion of bouyant vessel balloon section 216 (see FIG. 1) to batteries (not shown). in bay section 209b of buoyant vessel 215, or.may alternately power the downward thrusting electrical fans 199 directly to supplement or supplant fuel-burning jet thrusters 228.

FIG. 3 is a flow diagram of steps for utilizing a maneuverable descent de-booster capsule (de-booster) and a buoyant vessel for the deployment of deployable pole camera/communications surveying devices (buoy cameras) and proxy robotic devices over a target mission area at a remote location in space:

Identifying the target mission area from an vehicle in orbit over the remote location, 300;

Deploying the de-booster into orbit over the target mission area, 301;

Initiating gradual descent of the de-booster into the atmosphere of the remote location, 302;

Ejecting the buoyant vessel and its payload from the de-booster, with the buoyant portion of the buoyant vessel in a compressed (unfilled) state 303;

Filling the buoyant portion of the buoyant vessel with a lifting gas such as hydrogen or helium, 304;

Activating reconnaissance devices on the bay portion of the buoyant vessel, including video and other devices for monitoring and surveiling the target mission area, 305;

Maneuvering the buoyant vessel to refine mission site selection, 306;

Opening cargo bay doors at a predetermined altitude to deliver payloads including buoy cameras to the target mission site, 307;

Causing the buoyant vessel to rise in the atmosphere due to weight loss after payload delivery, 308; and Activating communication relay functions in the buoyant vessel while maintaining ongoing reconnaissance activities, 309.

Figure 4:
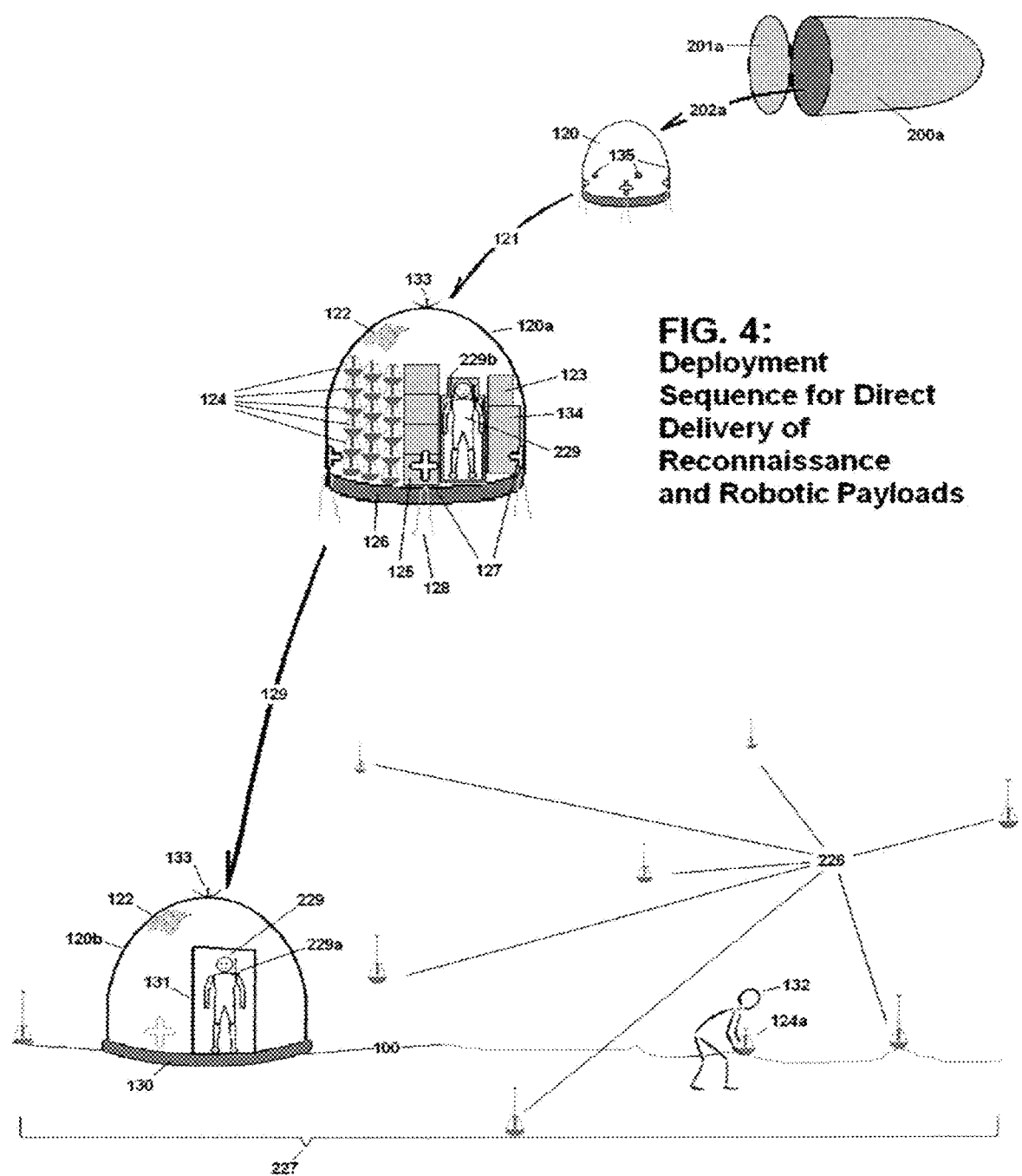
FIG. 4 illustrates an exemplary deployment sequence for direct delivery of reconnaissance and robotic payloads.

FIG. 4 depicts an exemplary deployment sequence for the direct delivery of reconnaissance and robotic devices, including at least one bipedal proxy robot 229 to a remote mission site 227 in a location in space without atmosphere such as Earth's moon, or in any situation where a direct delivery deployment strategy is preferable to the buoyant vessel approach of FIG. 1.

In FIG. 4 a spacecraft 200a is in orbit over an identified mission site 227. Though the preferred orbit of spacecraft 200a would be synchronous, it may otherwise pass slowly over the mission site in, for example, the case of Earth's moon, which does not rotate on its axis. From an optimal position over mission area 227, cameras, communications and other electronics on the proxy robotic devices and bipedal proxy robot 229, as well as communications devices on a maneuverable descent capsule 120 will be activated. Then a hatch 201a will open on spacecraft 200a to eject 202a descent capsule 120 and its cargo for direct delivery to mission area 227. Though the shape of capsule 120 is shown as a dome-topped cylinder, such depiction is exemplary only. On the sides of payload 120 are at least three high resolution video cameras 135, each fully moveable up, down, right, left, or in any intermediate direction. When gradual descent of capsule 120 has been initiated, cameras 135 will focus downward on mission site 227, assisting either human operators of the descent capsule stationed in spacecraft 200a or computers in either the spacecraft 200a or descent capsule 120 to maneuver over and identify an optimal site 100 on which to land.

If the overhead spacecraft 200a is manned, at least one bipedal proxy robot 229 aboard the descent capsule 120 may be activated and guided by a human handler on spacecraft 200a to maneuver over and land upon the optimal landing site 100. If spacecraft 200a is unmanned, an automatic, pre-programmed landing sequence will maneuver and land capsule 120, since path delay renders direct control of the landing impossible from Earth. Once the optimal landing site has been selected, cameras 135 will maintain focus on the terrain 100 immediately around that site. Upon landing; cameras 135 will be remotely controlled to capture mission activities as well as natural events like weather.

A magnified view of descending 121 capsule 120a shows photovoltaic solar panels 122 covering the outer skin of its dome. The solar panels 122 charge batteries 134 in the capsule that power cameras 135, communications and other electronics 123 as well as a robotic charging station for robotic vehicles and proxy robots 229. Additional payload cargo can include a plurality of buoy camera/communications devices 124 and spaces 125 for rocket fuel, mission support tools and equipment and other supplies. Bottom section 126 of capsule 120 consists of a heavy but collapsable material like sand, rubber or synthetic materials such as polymer beads. At least four 4-way jet nozzles 127 fire in select directions 128 to provide a counterforce against gravity during descent (powering downward jets as depicted) or guide the capsule horizontally to settle on an ideal landing site. Antenna 133 atop the dome of capsule 120 sends and receives data and communication to and from overhead satellites, including spacecraft 200a, and serves to relay such communication to and from the mission site 227 once the capsule 120 has landed.

After capsule 120 is safely on the ground 100 at mission site 227, it will double as a usable structure 120b at the site, with photovoltaic solar panels 122 on the dome continuing to charge the capsule's power supply batteries. Note that the bottom section 126 of capsule 120b has been compressed and pushed outward 130 by the force of landing on the ground 100 at mission site 227. Note as well the capsule door 131 with proxy robot 229 standing in the entrance, fully charged and complete with portable communications transceiver 229a, awaiting the follow-me command stream from its handler at mission control, likely on Earth but possibly in the overhead spacecraft 200a. When the appropriate follow-me commands arrive, proxy robot 229 will shore up and level the capsule structure 120b, repairing any damage as mission control deems necessary. Soon thereafter, the robot's handler at mission control will send follow-me commands for the proxy robot 229 to unpack the capsule's remaining payload. Of particular importance are the buoy camera/communication devices 124a and their careful placement 132 in a grid 226 extending kilometers around the capsule structure 120b (see FIG. 7C and description).

Figure 5:
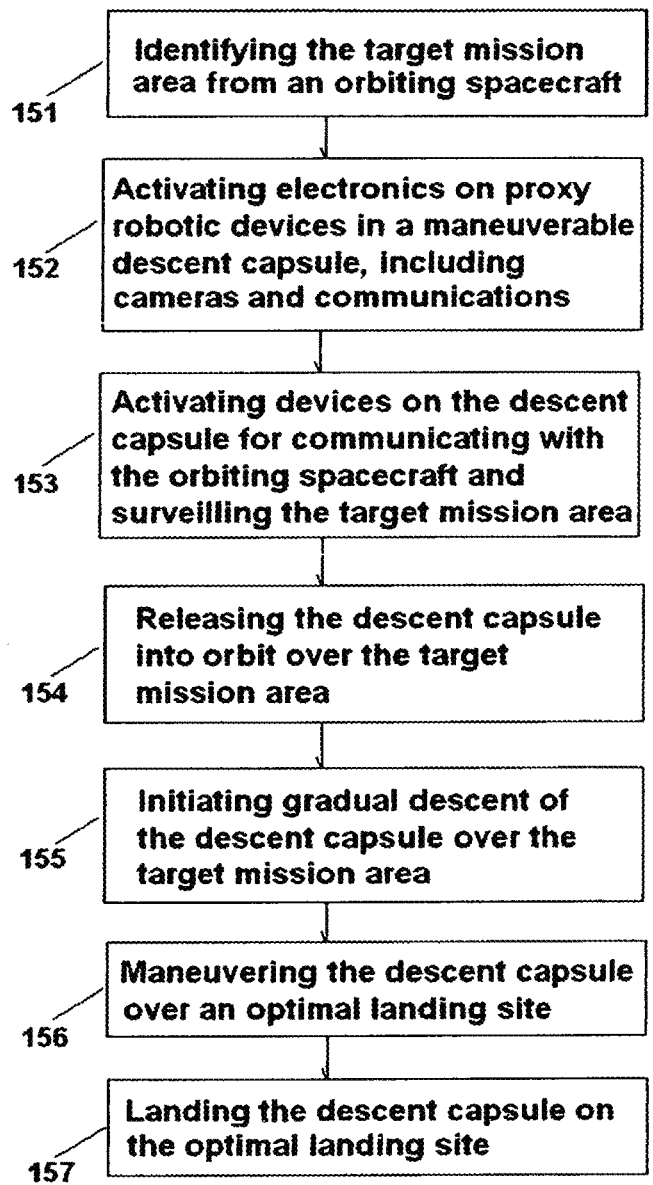
FIG. 5 is a flow diagram of a deployment sequence for the direct delivery of buoy cameras and proxy robotics to a remote mission site.

FIG. 5 is a flow diagram of a deployment sequence for the direct delivery of buoy cameras, proxy robotic devices and other mission components to a target mission area of a remote location in space utilizing at least one maneuverable descent capsule (descent capsule) carried by an orbiting spacecraft:

Identifying the target mission area from the orbiting spacecraft, 151;

Activating cameras, communications and other electronics on the proxy robotic devices in the maneuverable descent capsule, 152;

Activating communications devices on the maneuverable descent capsule for communicating with the orbiting spacecraft and surveiling the target mission area, 153;

Releasing the maneuverable descent capsule from the orbiting spacecraft into orbit over the target mission area, 154;

Initiating gradual descent of the maneuverable descent capsule over the target mission area, 155;

Maneuvering the maneuverable descent capsule over an optimal landing site, 156; and Landing the maneuverable descent capsule on the optimal landing site.

FIG. 6: Detailed Description of Proxy Robotics (Prior Art). In the present invention, a proxy robot can be bipedal—walking on two legs, and humanoid with head, limbs, joints, hands and feet generally corresponding to those of a typical human being—or assume any of a number of other robotic forms that allow human telepresence in space. Like virtually all robots in current use, humanoid robots move about and stay balanced via software, whether hard-coded into their motor systems or originating from external programs. Operating code may consist of prerecorded software routines or algorithms, or stream from a human operator at a keyboard, joystick or a graphical user interface (GUI). For example, the humanoid "Nao" robot mass-produced by Aldebaran Robotics in France can be programmed with C++, Python, Java, MATLAB, Urbi, C, and Net, and runs on three operating systems: Windows, Mac OS, Linux. See https://en.wikipedia.org/wiki/Nao (robot) The operating code that enables a proxy robot is translated into language it understands from data resulting from the captured motions of a human handler.

FIG. 6 is a block diagram depicting the various elements of a system for space exploration utilizing proxy robotics. This drawing 6 is similar to FIG. 1E in Stephens '248, and is included herein for explanatory purposes. The top section 401 depicts the remote mission site, including the proxy robot 403 and its support systems, while the bottom section 402 depicts the local mission control base with systems supporting proxy robotics. Remote site 401 and local site 402 are connected via communications means 405 at the site in space and 413 at the local base. Between communication means 405 and 413 is a path 410, for example, a path between Mars and the Earth.

Reconnaissance and monitoring means 404 surveil the remote mission site, particularly the area immediately surrounding a proxy robot 403. Video and data 406 from the reconnaissance means is combined with video and data 407 from the proxy robot by data aggregator 408, then sent 409 to mission site communications means 405 for transmission 411 over path 410 to local base communications means 413.

The received video and data stream 415 enters the path compensation subsection 414 at the local base, and is directed to terrain analysis computer 416 which produces an approximated real time (ART) video stream 417 for human handler 419 display 418. The ART video stream provides handler 419 with a view of the terrain surrounding proxy robot 403 at a specified time in the future exactly compensating for path delay. Separate data 420 from terrain analysis computer 416 goes to environment simulator/terrain replicator 421 which physically replicates 423 the ART terrain under and surrounding the remote proxy robot for human handler 419.

Motion capture devices 424 capture every movement and position 425 of handler 419, streaming the resulting signals 426 to follow-me data computer 427, which in turn produces a follow-me data stream 428 for transmission 412 by local base communication means 413. Mission site communications means 405 passes the follow-me data 429 to robot interface circuitry 430 which translates the data into signals 431 driving the motor systems in proxy robot 403, thus enabling the robot to emulate the movements of its human handler.

FIG. 7A illustrates a typical pattern resulting from even the most careful "cluster bombing" activity as described in FIGS. 1-3 above. In the drawing, each small cross 350 represents the position of a single buoy camera (e.g., 226 in FIG. 1), while circles 351 may define the range of the buoy camera's radio positioning device, with a radius around the buoy camera of perhaps two-hundred-fifty meters. Video pickup, on the other hand, is limited only to line-of-sight, which may stretch out many kilometers until interrupted by a hill or mountain or the curvature of the planet itself.

Note that some buoy cameras are bunched too closely together, while others are so separated as to create nulls or shadows in transmission, with resulting breaks in the mesh network the devices are designed to create. Buoy camera 352 has no radiation circle; this is to illustrate the very likely probability of some devices being damaged in deployment, landing in a bad position, etc. Nevertheless, most buoy cameras will activate, forming a mesh network. The locational data and video collected by the network paves the way for the next step: deployment of at least one proxy robot to the mission site on the planet's surface.

For each proxy robot on the ground at the remote mission site there is a human handler at mission control to guide its every movement—effectively in real time utilizing real time approximation techniques invented by the applicant. One of the first tasks of the human handler-guided proxy robots is to assess the condition of every buoy camera node in the mission site network, repairing or replacing defective units.

FIG. 7B: Once all possible devices are activated and functioning correctly, proxy robots like 229 in FIG. 1 are guided to optimally position each buoy camera into a well-functioning mesh network 355, transmitting video and data from the mesh network and robotic devices including each proxy robot at the remote site to a base at mission control for scientific analysis and use in the control of robotic devices and proxy robots. Note the slightly-overlapping radiation circles 354 in the drawing, assuring that each and every buoy camera 353 is in total contact with the six nodes immediately surrounding it. With all the elements of the network in order, proxy robots are guided in ongoing testing and maintenance activities to assure maximum results as the mission progresses.

FIG. 7C illustrates an exemplary sequence for the initial layout of buoy cameras by robotic devices including proxy robots directly delivered to the mission site (see FIGS. 4 and 6). In this drawing, circle 1 represents the descent capsule video and communication node, with individual buoy cameras carried to and placed in circles 2-19 respectively by at least one robotic device, in an expanding circle around the provisional base represented by the descent vehicle at the center of circle 1.

It should be pointed out that buoy cameras that are placed in position by robotic device rather than "cluster bombed" from a buoyant vessel can be lighter and more compact. The buoy shape remains an advantage, but the bases of individual buoy cameras can be filled by a proxy robot with sand, dust or regolith from the site itself. No parachute is required in this scenario, and each device's telescoping camera/communications pole can be extended by the proxy robot once the buoy camera is in place. The lighter, more compact structure of each buoy camera makes it possible for a proxy robot to carry a number of units for deployment in a backpack or push cart.

FIG. 7D depicts an alternative method for the layout of buoy cameras by at least one proxy robot that is being guided in the exploration of the terrain at the mission site concurrently with individual buoy camera placement. In this exemplary drawing, the proxy robot is directed to set up a base communication and video node (circle 1), then proceed to explore the mission site in a generally southern direction, placing buoy cameras at circle 2, then 3, 4 and 5 as exploration proceeds before heading northward and placing buoy cameras at circles 6, 7 and 8 before returning to the descent vehicle for recharge. Exploration can continue in this manner indefinitely, with some of the initial buoy cameras eventually removed and transferred ever further as the mission continues.

FIG. 8 is a flow diagram for establishing an optimal mesh network of buoy cameras at a remote mission site in space from a base station on Earth or otherwise distant from the remote mission site utilizing remotely controlled pole camera/communications surveying devices (buoy cameras) and remotely controlled robotic devices including at least one proxy robot:

Deploying a plurality of buoy camera/communications surveying devices to a remote mission site in space, 321;

Deploying robotic devices and their support systems including the at least one proxy robot to the mission site, 322;

Activating the robotic devices and the at least one proxy robot to configure a provisional base at the remote mission site, 323;

Remotely guiding the at least one proxy robot in the setup and operation of the support systems, 324;

Remotely guiding the at least one proxy robot in the optimal positioning of buoy cameras to form a mesh network at the remote mission site, 325;

Activating cameras, communications and position locating devices in each buoy camera to collect video and data from the remote mission site, 326;

Remotely guiding the at least one proxy robot in the maintenance of the mesh network, including the ongoing repair or replacement of malfunctioning devices, 327; and Transmitting video and data from the mesh network and the at least one proxy robot to the base station distant from the remote mission site for analysis and use in the operation of the at least one proxy robot, 328.

The current application focuses on reconnaissance and monitoring systems including early and ongoing site surveillance by satellite or spacecraft and the deployment of such monitoring means as balloons and pole cameras as well as robotic devices, proxy robots and their support systems.

The foregoing aspects of the disclosure are merely examples and are not to be constituted as limiting the invention; various features of the invention described herein can be implemented in different systems without departing from the invention. The description of the aspects of the present disclosure is intended to be illustrative, and not to limit the scope of any claims. As such, the present teachings can be readily applied to other types of apparatus and many alternatives, modifications, and variations will be apparent to those skilled in the art.

I claim:

1. A method for the deployment of reconnaissance devices and proxy robotic devices in a target mission area on Mars or another remote location in space with an atmosphere by utilizing at least one maneuverable descent de-booster capsule and at least one buoyant vessel for the deployment, comprising:

identifying the target area from an orbiting vehicle;

deploying from a cargo door in the orbiting space vehicle the maneuverable descent de-booster capsule into orbit over the target area;

initiating gradual descent of the maneuverable descent de-booster capsule in the atmosphere of the remote location in space;

ejecting the buoyant vessel from the maneuverable descent de-booster capsule, wherein a buoyant section of the buoyant vessel is in a compressed state, and wherein a bay section of the buoyant vessel contains payload cargo;

filling the buoyant section of the buoyant vessel with a lifting gas to transform the buoyant section into a large balloon;

activataing reconnaissance functions on the bay section of the buoyant vessel devices to surveil the target mission area;

maneuvering the buoyant vessel to refine mission site selection;

opening at least one cargo bay doors in the bay section of the buoyant vessel at a predetermined altitude to deliver the payloads cargo to the target mission area, wherein payload delivery causes the buoyant vessel to rise in the atmosphere over the target mission area due to weight loss; and activating communication relay functions in the buoyant vessel while maintaining ongoing reconnaissance activities.

2. The method of claim 1, wherein lift is provided to stabilize descent of the buoyant vessel by firing downward-thrusting jet nozzles on the bay section of the buoyant vessel.

3. The method of claim 1, wherein lift is provided to stabilize descent of the buoyant vessel by activating downward-thrusting electric motor fans on the bay section of the buoyant vessel.

4. The method of claim 1, wherein maneuvering of the buoyant vessel is aided by four-way jet nozzles on each of the four sides of the bay section.

5. The method of claim 4, wherein the four-way jet nozzles face upward, downward, and to the right and left.

6. The method of claim 5, wherein the downward facing jet nozzles are activated to slow descent of the buoyant vessel.

7. The method of claim 1, wherein maneuvering of the buoyant vessel is aided by at least one downward-thrusting electric motor fan mounted to the bay section of the buoyant vessel.

8. The method of claim 7, wherein the at least one electric motor fan receives electrical power from at least one battery in the bay section of the buoyant vessel.

9. The method of claim 8, wherein the at least one battery is charged by at least one photovoltaic solar panel mounted on the surface of the buoyant section of the buoyant vessel.

10. The method of claim 1, wherein gradual descent is aided by a heat shield on the bottom of the de-booster capsule.

11. The method of claim 1, wherein the reconnaissance devices comprise deployable pole camera/communications surveying devices also known as buoy cameras.

12. The method of claim 11, wherein the deployable pole camera/communications surveying devices comprise payload cargo for delivery to the target mission area.

13. The method of claim 1, wherein the proxy robotic devices comprise payload cargo for delivery to the target mission area.

14. The method of claim 1, wherein the communications relay functions in the buoyant vessel relay signals between the target mission area and mission control.

* * * * *

UNITED STATES PATENT AND TRADEMARK OFFICE
CERTIFICATE OF CORRECTION

PATENT NO. : 11,014,670 B2
APPLICATION NO. : 16/136249
DATED : May 25, 2021
INVENTOR(S) : Kenneth Dean Stephens, Jr.

It is certified that error appears in the above-identified patent and that said Letters Patent is hereby corrected as shown below:

In the Claims

Claim 1, Column 11, Line 21 the word "vehicle" should read "space vehicle".

Claim 1, Column 11, Line 38 the line "the buoyant vessel devices to surveil the target mission" should read "the buoyant vessel; to enable reconnaissance devices to surveil the target mission".

Signed and Sealed this
Seventeenth Day of September, 2024

Katherine Kelly Vidal
*Director of the United States Patent and Trademark Office*